United States Patent [19]

Alexander, Jr. et al.

[11] Patent Number: 4,936,439
[45] Date of Patent: Jun. 26, 1990

[54] CONVEYOR BELT SCRAPER CONTROL

[75] Inventors: John S. Alexander, Jr., Prospect; John Burkert, Bulter, both of Pa.

[73] Assignee: Alexander Mill Services, Inc., Prospect, Pa.

[21] Appl. No.: 219,222

[22] Filed: Jul. 15, 1988

[51] Int. Cl.⁵ .............................................. B65G 45/16
[52] U.S. Cl. .................................. 198/499; 15/256.5; 92/108
[58] Field of Search ............... 198/497, 499, 502.4; 15/256.5; 92/108

[56] References Cited

U.S. PATENT DOCUMENTS

| | | | |
|---|---|---|---|
| Re. 31,338 | 8/1983 | Hurt | 198/502.4 |
| 2,545,882 | 3/1951 | Hall | |
| 3,128,207 | 4/1964 | Schmitt | |
| 3,163,878 | 1/1965 | Smith et al. | |
| 3,598,231 | 8/1971 | Matson | |
| 3,631,968 | 1/1972 | Ward | |
| 3,722,667 | 3/1973 | Olson | |
| 3,782,534 | 1/1974 | Holleman | |
| 3,848,734 | 11/1974 | Heiland | |
| 3,875,613 | 4/1975 | Pincus | 17/24 |
| 3,949,866 | 4/1976 | Pott | |
| 3,994,388 | 11/1976 | Reiter | |
| 4,036,351 | 7/1977 | Reiter | |
| 4,105,109 | 8/1978 | Schultz | |
| 4,182,444 | 1/1980 | Fisher | |
| 4,189,046 | 2/1980 | Ward | |
| 4,202,437 | 5/1980 | Gordon | |
| 4,242,947 | 1/1981 | Renner et al. | 92/108 |
| 4,269,301 | 5/1981 | Gibbs | |
| 4,367,120 | 1/1983 | Hendrikz | |
| 4,402,394 | 9/1983 | Stoll | |
| 4,520,917 | 6/1985 | Sillivent et al. | |
| 4,533,036 | 8/1985 | Gordon | |
| 4,694,952 | 9/1987 | Meijer | 198/499 |

FOREIGN PATENT DOCUMENTS 1451759 10/1976 United Kingdom ................. 198/499

*Primary Examiner*—Joseph E. Valenya
*Attorney, Agent, or Firm*—Webb, Burden, Ziesenheim & Webb

[57] ABSTRACT

A scraper control system for conveyor belt cleaning includes a pair of elongated scraper elements mounted at opposed ends to a pair of spring-biased arms. The sraper mounting arms are attached to a separate shaft at each side of the belt. Each shaft is torqued by one of an identical pair of torque activator units. Each torque activator unit includes an extensible bellows member adapted to be placed into communication with a regulated, high pressure source of water, such as mine waste water. The bellows member has a mounting are fixed relative to the frame of the conveyor and a moveable torque are connected at one end to the bellows member and fixed at a seond end to the shaft. High pressure water preferably mine waster water is regulated between 15 to 100 psig and introduced into the bellows member to cause the torque arm to exert a force on the shaft which, in turn, transmits the force through the spring-biased mounting arms to the scraper elements. A water supply line to the bellows members includes a bladder-type accumulator to dampen any shock loading effects which may be present.

14 Claims, 3 Drawing Sheets

CONVEYOR BELT SCRAPER CONTROL

BACKGROUND OF THE INVENTION

The present invention relates generally to conveyor belt cleaning systems employing scrapers and more particularly to an improved scraper tension control for such conveyor belt cleaning systems.

Heretofore, it has been known to use elongated scraper elements to forcibly engage and clean outer belt surfaces of an endless belt conveyor as the belt moves from a discharge pulley at an end of a run, for example. The scraper element or elements are usually spring-biased to compressively contact the belt surface and thereby insure constant removal of particulate matter adhered thereto. Such conveyor belts and scraper cleaners are commonly used in a wide variety of material handling operations, such as, for example, in coal mining, iron ore and copper mining, to mention only a few.

In such belt cleaning scrapers, it has been proposed to utilize various means in addition to compressive springs to insure that a constant scraper pressure or tension is applied to the outer underside surface of the belt to provide improved cleaning action Exemplary of such are the scraper devices is the manually adjustable, spring-biased scraper disclosed in U.S. Pat. No. 3,631,968 to Ward; the flexible scraper/pneumatic air cylinder assist arrangement disclosed in U.S. Pat. No. 4,269,301 to Gibbs; and the rigid scraper/pneumatic air cylinder biasing system disclosed in U.S. Pat. No. 4,402,394 to Stoll. A further hydraulic/pneumatic cylinder scraper biasing means is disclosed in U.S. Pat. No. 4,189,046 to Ward et al. These above prior systems employing pneumatic or hydraulic assists all suffer from a common shortcoming, namely, they each require a separate air compressor or hydraulic motor unit to drive the respective pneumatic or hydraulic scraper biasing equipment As such, these prior systems require electric, gasoline or diesel driven motors to power the equipment or must have motors which derive their power input from the running conveyor belt system. Needless to say, such auxiliary equipment is expensive to purchase, operate and maintain and is susceptible to field damage and breakdown in a rough field environment, such as, for example, in mining applications. Exposure to corrosive liquids such as acid mine waste water also shortens the service life of exposed precision components.

The present invention solves these problems by providing an improved conveyor belt cleaning system which employs constant torquing of the belt scrapers without the need for auxiliary hydraulic fluid motors or air compressors heretofore required in prior arrangements. The improved scraper control system of the present invention is particularly suited for use in mining operations such as coal mining wherein a pressurized source of mine waste water is readily available to energize the torquing device. The invention employs a limited number of moving parts including a central torquing activator unit constructed of a non-corrosive material which can withstand the acidic mine waste water with minimum maintenance and extended service life.

SUMMARY OF THE INVENTION

Briefly stated, the improved scraper control system of the present invention includes a pair of identical spaced-apart torque activator units, each adapted, through appropriate means, to be mounted to a structural frame of a conveyor belt spaced on either side of the belt, preferably on an underside portion thereof A pair of scraper elements, preferably of a polyurethane material, are mounted at their ends to the torque activator units by way of spring-biased arms. The scraper elements span the belt and are adapted to forcibly engage the moving belt to remove particulate material from the surface thereof on its return flight, usually downstream from the end pulley. A continuous torque load of a constant amount is applied to the spring-biased scraper arms by the pair of torque activator units. Each torque activator unit includes a hexagonal shaft secured at one end to one of the spring-biased arms of the scraper units and attached at the other end to a torque arm of an activator bellows. The shaft is rotatably mounted within a stationary tubular bearing member which carries a mounting plate thereon for attachment to the conveyor structural frame. The tubular bearing also carries an apertured disc at an outer end for attachment of a mounting arm of the activator bellows thereto. The activator bellows comprises a linearly expandable bellows member, preferably of reinforced rubber material having metal end plate portions with bracket plates affixed thereto for securement at respective end plate portions to the torque arm and to the mounting arm. The bellows member has an inlet water fitting which is adapted to be placed into communication, via flexible tubing, pipe or like conduit with a source of pressurized water. A suitable source in coal mining operations, for example, is pressure regulated mine waste water. Mine waste water at a supply pressure of up to about 500 psig is regulated, and depending upon the width of the belt is supplied to the bellows members at a constant regulated pressure of between about 15 psig to about 100 psig. The constantly regulated high pressure water supply causes the bellows member to expand linearly which, in turn, causes the torque arm to rotate the hexagonal shaft and its attached spring-biased scraper support arms in a direction normal to the conveyor belt surface. Thus, an independent and constant torquing force is applied to each of the shafts on opposed sides of the conveyor to insure constant cleaning action without the need for expensive, noisy auxiliary equipment while reducing power costs, as well as maintenance and operator time.

DETAILED DESCRIPTION OF THE INVENTION

Figure 1:
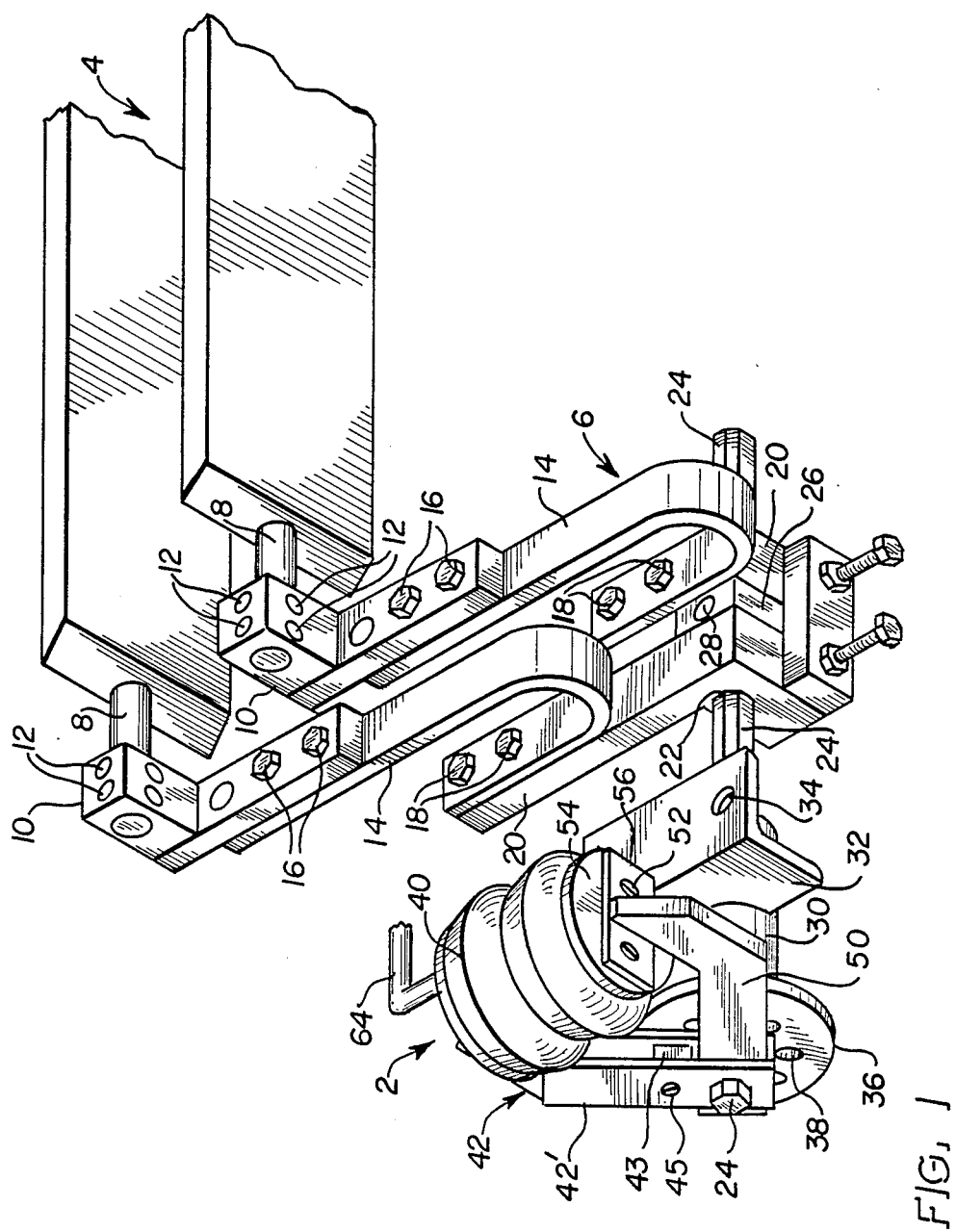
FIG. 1 is a perspective view of one of the pair of torque activator units and scraper members of the present invention.
Figure 3:
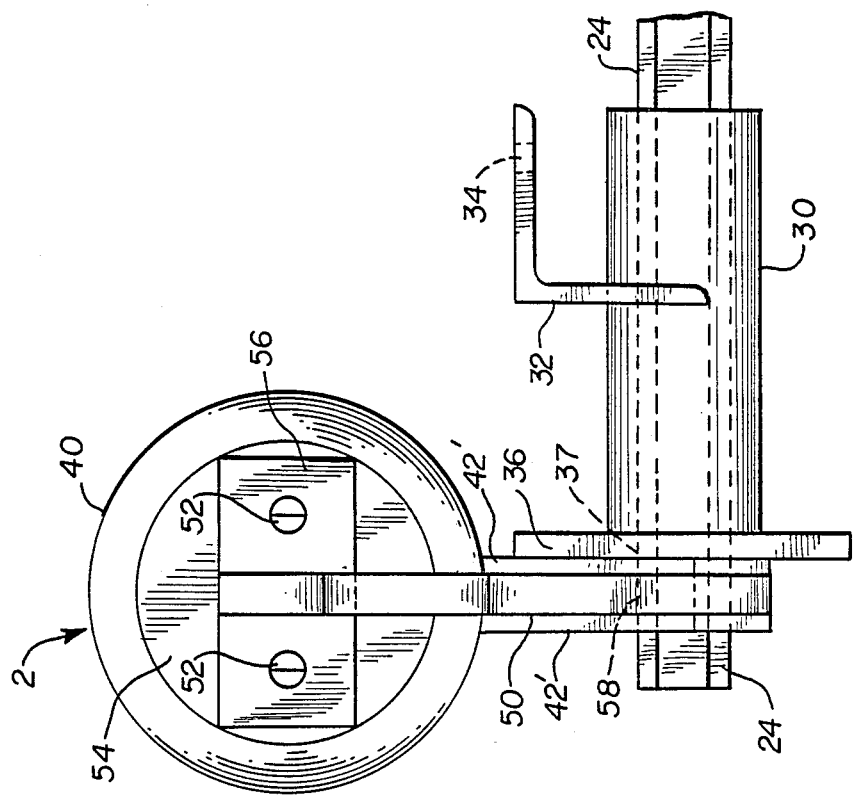
FIG. 3 is a partial side elevation view of the torque activator unit of FIGS. 1 and 2; and, FIG. 4 is a partially exploded plan view of the entire invention including the water piping thereof and related flow control devices.
Figure 4:
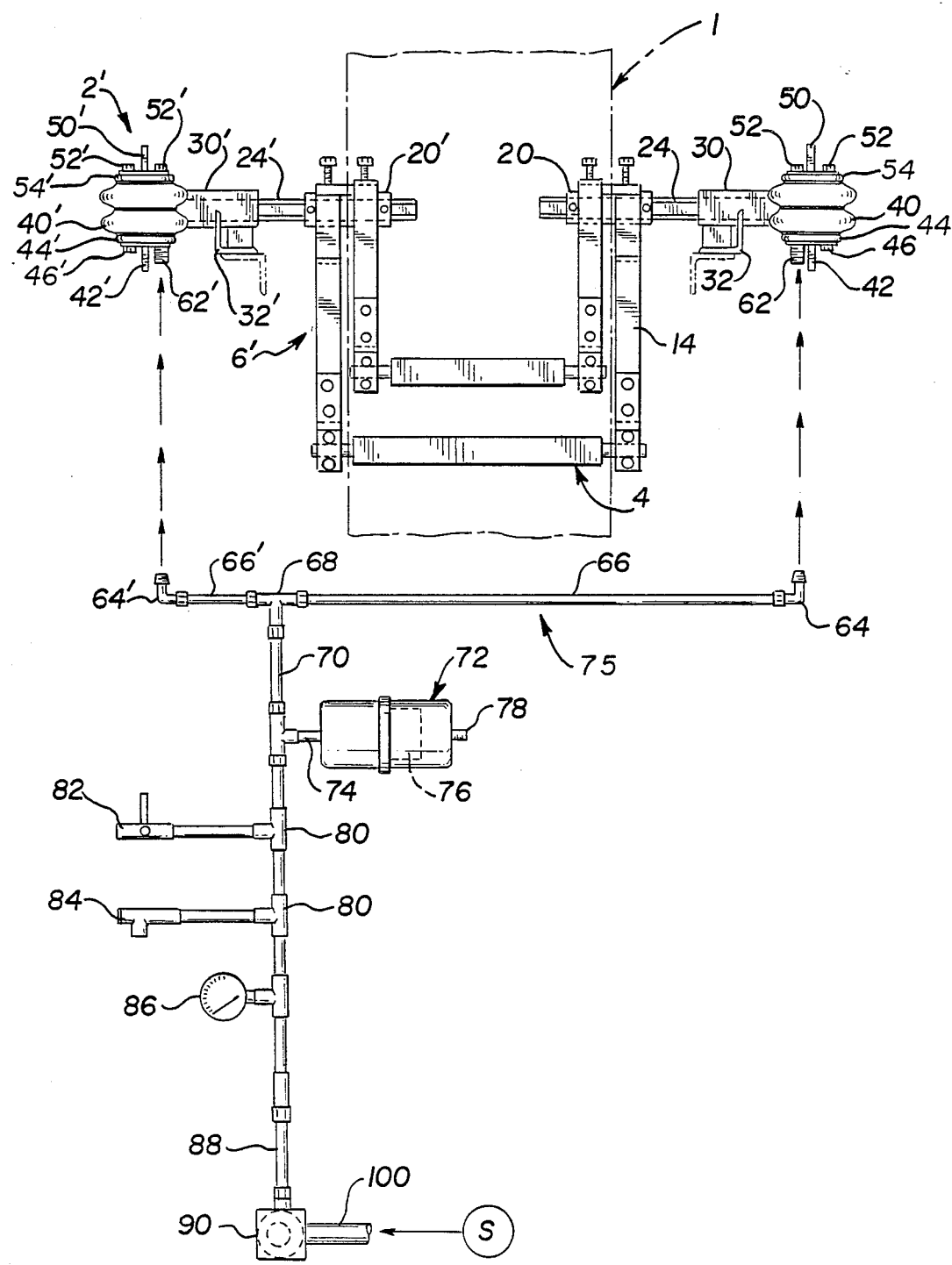

Referring to the drawings, FIG. 1 depicts a torque activator unit 2 of the present invention, it being understood that an identical second torque activator unit 2' is mounted on an opposite side of a conveyor belt 1 (as seen in FIG. 4) in spaced-apart relation to the first unit 2. Identical elements from FIG. 1 are identified by the same primed numbers in FIG. 4. A pair of scraper members 4 extend between the torque activator units 2 and 2' to span the width of the conveyor belt 1 in a known manner to clean particulate material therefrom, preferably on its return flight after traversing the material discharge pulley. The scraper members 4 are preferably molded from a high-abrasive resistant material, such as polyurethane, which is not only wear resistant but also able to withstand impact with the metal belt fasteners without damaging them. As best seen in FIG. 1, the scraper members 4 include integral shafts 8 which are received within a pair of "L"-shaped mounting brackets 10 and secured therein by grouped pairs of set screws 12. The scraper members 4 are carried at each end by a spring-biased arm assembly 6 which includes a pair of "U"-shaped leaf springs 14 attached by bolts 16 at their respective upper ends to the mounting brackets 10. The lower ends of the leaf springs 14 are attached by bolts 18 to a pair of "L"-shaped shaft mounting brackets 20. The shaft mounts 20 have a bore 22 formed therethrough to receive a shaft 24 therein. The shaft 24 preferably has a cross section in the shape of a hexagon to prevent relative rotation between the mounting brackets 20 and shaft 24 to insure positive torque transfer to the other shaft mounted components as more fully explained hereinafter. In this regard, the shaft mounting brackets 20 include an integral spacer 26 which has a set screw 28 threadably moveable therein for locking engagement with one of the flat surfaces of the hexagonal shaft 24.

A stationary hollow bearing tube 30 is mounted around the shaft 24 to permit the shaft 24 to rotate therein. The bearing tube 30 carries a mounting flange or angle 32 on its outer sidewall. The mounting flange or angle 32 has a plurality of apertures 34 formed therein to receive bolts for mounting to the structural frame of the conveyor belt 1 (not shown) in a known manner.

Figure 2:
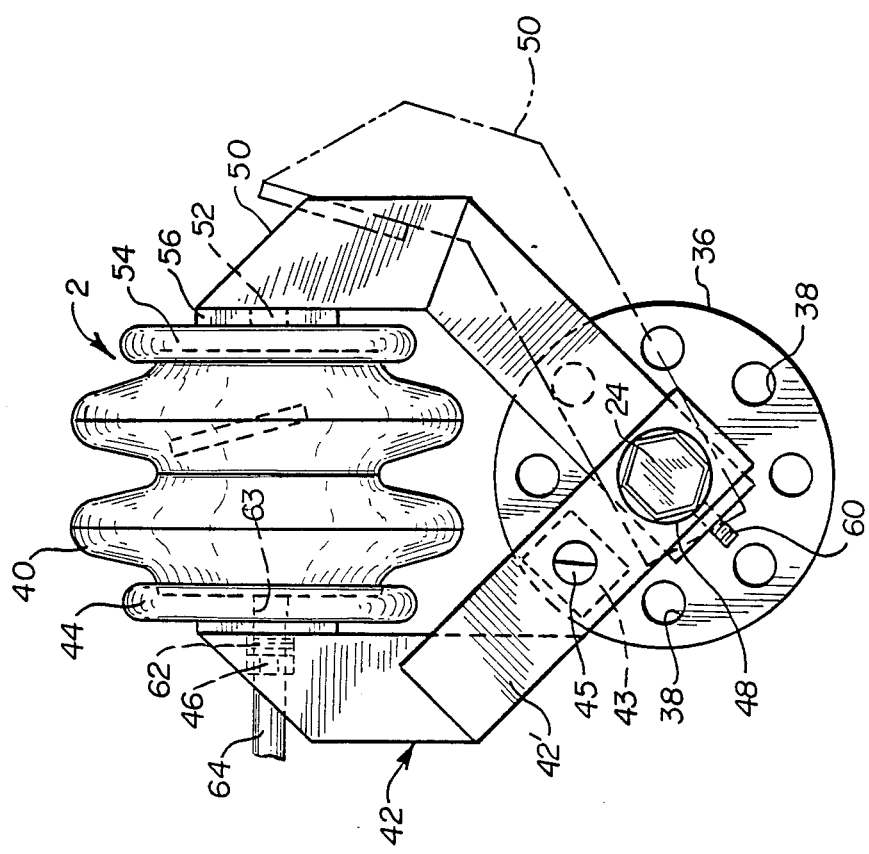
FIG. 2 is an end elevation view of the torque activator units of FIG. 1.

An outer end of the bearing tube 30 carries an apertured circular disc or plate 36 which is secured thereto by welding, for example. As seen in FIG. 2, the disc 36 has a hole 37 formed through its center to permit the passage of the shaft 24 therethrough so as to permit relative rotation between the disc and shaft for adjustment of the scrapers relative to the belt. Disc 36 has a plurality of spaced-apart apertures 38 formed adjacent its perimeter, the purpose of which will be explained in more detail hereinafter.

An extensible bellows member 40 is situated at the outer end of the bearing tube 30 and is attached thereto at a stationary first end by a forked mounting arm 42. Mounting arm 42 is secured by a bracket at one end by way of nuts 46 attached to threaded studs on a metal end plate 44 carried by an end of the rubber bellows member 40. A forked end 42' of the mounting arm 42 has a round hole 48 formed through both of the tines of the fork to permit the rotation of shaft 24 therein The forked end 42' of the mounting arm 42 has a spacer 43 positioned between the tines and an elongated screw fastener 45 passing therethrough for securement within one of the apertures 38 of the stationary disc 36. Spacer 43 prevents the tines 42' from being deflected inwardly and interfering with the movement of a torque arm 50 when the fastener 45 is tightened.

A moveable torque arm 50 is attached to a metal plate 54 at a second end of the bellows member 40 by way of screws 52 passing through a mounting plate 56 carried by the torque arm. The bellows end plate 54 has a pair of blind tapped holes formed therein for reception of the screws 52 The rotatable torque arm is positioned between the tines 42' of the forked mounting arm 42 and is fitted on the shaft 24 through a hole 58 formed in the torque arm 50. The torque arm 50 is attached to the shaft 24 by way of a set screw 60 secured in the end of the arm 50 to engage the hexagonal shaft 24, preferably at one of its flat surfaces to prevent relative rotation between the shaft and the torque arm The stationary end plate 44 of the bellows member 40, adjacent mounting arm 42, carries a threaded fitting 62 which communicates through a hollow bore 63 at one end with the hollow interior of the rubber bellows. A threaded elbow fitting 64 is attached at the other end of the fitting 62. The elbow fitting 64 is placed in communication with a source of pressure regulated water, such as a source of mine waste water. Accumulated ground water pumped from a coal mine as water is a readily available water source carrying a high surface pressure, ranging up to about 500 psig. A regulated water pressure of between about 15 psig to about 100 psig is suitable to activate and maintain the bellows 40 in an extended position shown is phantom lines in FIG. 2. The width of the belt will determine the pressure employed, with greater belt widths requiring higher water pressures. The bellows member 40 is constructed of a reinforced rubber material and has a convoluted wall construction which provides linear movement of the end plate 54 when the bellows member expands due to introduction of the pressurized water through the inlet fitting 62 therein. The bellows member 40 is a commercially available item, sold under the trademark "RIDERITE", Part No. W-013583401 by Firestone Tire and Rubber Company. This item is commonly used as an air spring in campers and motor homes. While the common application of this product calls for the containment of pressurized air within the bellows, I have discovered that it is also quite suitable for the leak proof containment of water. The rubber construction of the bellows is also resistant to the acid-like nature of mine waste water and the particulate matter entrained therein Referring to FIG. 4, the water supply system is identified generally by the reference numeral 75. The supply system 75 includes a threaded fitting 62 carried by the bellows end plate 46 is attached to an elbow 64 which, in turn, is attached to a length of flexible nylon tubing 66 of ⅜ inch in diameter, for example. A similar elbow 64, is connected to other bellows member 40, and tubing 66, which are joined at tee fitting 68. The fitting 68 is attached to a length of nylon tubing 70 which communicates with a number of water flow and pressure control components within system 75 as will be explained. These components are interconnected by tee fittings 80, tubing 88, pressure regulator valve 90 to a pipe 100 which is connected to a high pressure source "S", such as to the pump handling the mine waste water discharge. The aforementioned water flow and pressure control components include an adjustable water pressure regulator and shutoff valve 90 which, as stated, is connected to the pipe 100 from the high pressure source "S". The mine waste water, at pressures as high as 500 psig, in pipe 100 is regulated downwardly by valve 90 to an operating pressure within the range of between about 15 psig to about 100 psig. The width of the belt 1 will determine the water pressure regulated within the tubing 88 by the valve 90. The wider the conveyor belt, the higher the pressure required on the scraper elements 4 to insure uniform cleaning. A pressure gauge 86 is positioned downstream from regulator valve 90 to permit visual reading of the regulated pressure. A pressure relief valve 84 is located downstream from the regulator valve and shutoff valve 90 and gauge 86 to prevent unwanted pressure surges in the water feed lines 88 and 70 which could damage the bellows members 40, 40'. The pressure relief valve 84 is preferably set to open when the line pressure exceeds 125 psig. A bleeder valve 82 is also preferably employed in the water supply system and is placed in communication with the regulated, pressurized water downstream from the pressure relief valve 84. The bleeder valve 82 is used to drain the supply system 75 should the occasion arise. Total shut down of the water system 75 is easily accomplished by merely closing off the valve 90 which functions both as a pressure regulator and a shutoff valve.

A bladder-type accumulator 72 is also preferably used in the water supply system 75 and is placed in the system upstream from the tubing section 70. Since water is a substantially non-compressible fluid, any shock loading applied to the scrapers 4 by the belt 1 is transmitted to the bellows member 40, 40' and will be instantly forced upstream to the previously described control components. Such heavy shock loading occurring, for example, when the scrapers contact a belt splice can damage unprotected components in the supply system 75. The accumulator 72 acts as a shock absorber in the water supply system and prevents such damage. The accumulator 72 which, for example, has a 20 fluid ounce capacity, includes a rubber diaphragm 76 enclosed within a fluid tight chamber which is placed in communication with the water by way of an inlet 74. Compressed air is introduced through fitting 78 to a second side of the diaphragm 76 and acts as compressible fluid shock absorber to counter the presence of shock loading transmitted from the belt 1.

Pressure regulation of the external source of water is, of course, required since high pressure surges could weaken and rupture the bellows member 40. Regulated pressure also maintains a desirable constant torque on the scraper elements 4 which provides uniform cleaning action with undue drag on the conveyor belt.

In use, the pressurized water linearly expands the bellows member to exert force on the torque arms 50, 50, which rotatably moves the shafts 24, 24' attached thereto. The shafts 24, 24' in turn transfer the applied torque to the spring-biased mounting arms 6, 6' to continuously force the scraper elements 4 into engagement with the moving conveyor belt 1.

The fact that each of the spaced-apart torque activator units 2, 2' have separate shafts 24, 24', permits the invention to be easily and inexpensively fitted to conveyor belts having varying belt widths. The only components that need be of a different dimension are the scraper members 4.

Having thus described our invention with the detail and particularly required by the Patent Laws, what is claimed and desired to the protected by Letters Patent is set forth in the following claims.

What is claimed is:

1. Improved scraper control system for cleaning a conveyor belt, said scraper of the type comprising at least one elongated scraper element adapted to contact a surface of the conveyor and a pair of spaced-apart spring-biased mounting arms for mounting said at least one scraper element therebetween, wherein said improvement comprises:
   a pair of torque activator units, spaced-apart on opposite sides of said conveyor belt, each of said torque activator units including a water activated bellows member of a convoluted, flexible rubber material having a closed interior for containing a volume of pressurized water and adapted to linearly expand in response to said pressurized water, said bellows member including an inlet fitting having first and second ends, said inlet fitting communicating with the closed interior of the bellows member at the first end and adapted to be placed into communication with a source of pressurized mine waste water at the second end, said bellows member having a first end plate portion attached to a stationary mounting arm and a second end plate portion attached to a movable torque arm;
   means attached to said mounting arm adapted to be rigidly affixed to a frame element of the conveyor belt;
   shaft means secured adjacent a first end thereof to the spring-biased mounting arm of at least one scraper element and secured at a second end to the torque arm of the bellows member, whereby, is use, said source of pressurized mine waste water forces said bellows member to linearly expand to move said torque arm and the attached shaft means to apply a constant torque to said shaft and thereby force at least one scraper element against the conveyor belt.

2. The scraper control system of claim 1 wherein the attachment means comprises a bearing tube carrying a mounting flange, said flange adapted to be secured to the frame of the conveyor belt; said bearing tube also carrying an apertured, fixed disc adjacent said mounting arm, said mounting arm having a fastener hole therethrough and having a hole at one end thereof for mounting on said shaft means to permit said mounting arm to be rotated about said shaft means for alignment of said fastener hole with any one of the apertures in the disc, an elongated fastener affixed within said fastener hole and one of said aligned apertures to secure said mounting arm to said disc.

3. The scraper control system of claim 2 wherein the mounting arm is generally forked-shaped and comprises a spaced pair of tines rotatably mounted at one end on said shaft means and wherein an end of said torque arm is fixedly secured to said shaft means and positioned between said tines.

4. The scraper control system of claim 3 including a spacer member positioned between said tines at said fastener hole and having a hole therethrough to permit said elongated fastener to pass therethrough, whereby said spacer member maintains a clearance for free passage of said torque arm between said tines when said fastener is tightened.

5. The scraper control means of claim 1 wherein the shaft means has a hexagonally-shaped cross section, whereby said hexagonal shape prevents relative rotation between the torque arm, spring-biased mounting arm and said shaft means when a torque is applied thereto.

6. The scraper control system of claim 1 including a water supply system comprising tubing means attached to the first ends of the inlet fittings carried by each of the bellows members, said system also including a pressure regulator valve communicating with the tubing means and adapted to be placed into communication with the source of high pressure mine waste water.

7. The scraper control system of claim 6 including accumulator means positioned in communication with the tubing means intermediate said inlet fittings and said pressure regulator valve for absorbing any shock loading present in the water supply system.

8. The scraper control system of claim 6 including a pressure relief valve communicating with said tubing means adapted to open at a predetermined pressure value.

9. The scraper control system of claim 8 wherein the predetermined pressure value for opening the pressure relief valve is about 125 psig.

10. The scraper control system of claim 8 including a pressure gauge and a bleeder valve communicating with said tubing means.

11. A method of applying a constant force to a conveyor belt scraper comprising:
   attaching said scraper to a mounting arm means;
   contacting said conveyor belt with said scraper, wherein said mounting arm means is attached to a shaft means, and said shaft means is rotatably connected to a flexible bellows member which is adapted to linearly expand when internally pressurized;
   introducing a pressurized mine waste water to said bellows member whereby said bellows member linearly expands to exert a torquing force to said shaft means to transmit said torquing force to said mounting arm means and thereby urge said scraper into a constant, forced engagement with the surface of the conveyor belt.

12. The method of claim 11 including the steps of regulating the mine waste water from a higher pressure value to a lower pressure value.

13. The method of claim 12 wherein the higher pressure value is a value up to about 500 psig and the lower regulated value is between about 15 psig and about 100 psig.

14. The method of claim 13 wherein the mine waste water is pumped from a coal mine.

* * * * *

UNITED STATES PATENT AND TRADEMARK OFFICE
CERTIFICATE OF CORRECTION

PATENT NO. : 4,936,439

DATED : June 26, 1990

INVENTOR(S) : John S. Alexander, Jr. and John Burkert

It is certified that error appears in the above-identified patent and that said Letters Patent is hereby corrected as shown below:

On the title page:

After Inventors: information "Bulter" should read --Butler--.

After FOREIGN PATENT DOCUMENTS information insert
--OTHER PUBLICATIONS  Advertising brochure of Alexander Mill Services, Inc., entitled: "The Skru-Jak Conveyor Belt Cleaner" (4 pages)--.

Abstract Line 4 "sraper" should read --scraper--.

Abstract Line 10 "are" should read --arm--.

Abstract Line 12 "are" should read --arm--.

Abstract Line 13 "seond" should read --second--.

Abstract Line 14 "waster" should read --waste--.

Column 1 Line 25 after "action" insert --.--.

Column 1 Line 26 "is" should read --in--.

UNITED STATES PATENT AND TRADEMARK OFFICE
CERTIFICATE OF CORRECTION

PATENT NO. : 4,936,439            Page 2 of 3

DATED : June 26, 1990

INVENTOR(S) : John S. Alexander, Jr. and John Burkert

It is certified that error appears in the above-identified patent and that said Letters Patent is hereby corrected as shown below:

Column 1 Line 39 after "equipment" insert --.--.

Column 2 Line 3 after "thereof" insert --.--.

Column 3 Line 56 after "therein" insert --.--.

Column 4 Line 1 after "52" insert --.--.

Column 4 Line 17 after "as" insert --waste--.

Column 4 Line 22 "is" should read --as--.

Column 4 Line 40 after "therein" insert --.--.

Column 4 Line 47 "40", should read --40'--.

UNITED STATES PATENT AND TRADEMARK OFFICE
CERTIFICATE OF CORRECTION

PATENT NO. : 4,936,439

DATED : June 26, 1990

INVENTOR(S) : John S. Alexander, Jr. and John Burkert

It is certified that error appears in the above-identified patent and that said Letters Patent is hereby corrected as shown below:

Column 4 Line 47 "66", should read --66'--.

Column 5 Line 44 "50," should read --50'--.

Column 5 Line 56 "particularly" should read --particularity--.

Column 5 Line 57 "the" should read --be--.

Claim 1 Line 21 Column 6 "is" should read --in--.

Signed and Sealed this

Eighth Day of October, 1991

*Attest:*

HARRY F. MANBECK, JR.

*Attesting Officer*　　*Commissioner of Patents and Trademarks*